United States Patent [19]

Kurita

[11] Patent Number: 5,610,457
[45] Date of Patent: Mar. 11, 1997

[54] BRUSHLESS MOTOR WITH HALL ELEMENTS FOR CONTROLLING DRIVE CIRCUIT AND FOR DETECTING A POSITION OF ROTOR BY USE OF MAGNETIC FLUX VARYING MEANS

[75] Inventor: Yukinobu Kurita, Nagano, Japan

[73] Assignee: Kabushiki Kaisha Sankyo Seiki Seisakusho, Nagano, Japan

[21] Appl. No.: 385,125

[22] Filed: Feb. 7, 1995

[30] Foreign Application Priority Data

Feb. 7, 1994 [JP] Japan .................... 6-034108

[51] Int. Cl.⁶ .................................... H02K 11/00
[52] U.S. Cl. .................. 310/68 B; 310/68 R; 310/67 R; 310/261; 310/156; 73/862
[58] Field of Search ................ 310/68 B, 68 R, 310/81, 156; 73/862

[56] References Cited

U.S. PATENT DOCUMENTS

| | | | |
|---|---|---|---|
| 4,242,608 | 12/1980 | Ishigaki et al. | 310/68 R |
| 4,801,830 | 1/1989 | Ogino et al. | 310/68 B |
| 4,952,830 | 8/1990 | Shirakawa | 310/68 B |
| 4,961,017 | 10/1990 | Kakinoki et al. | 310/71 |
| 5,148,069 | 9/1992 | Nonaka et al. | 310/68 R |
| 5,194,771 | 3/1993 | Otsuki et al. | 310/68 B |
| 5,252,873 | 10/1993 | Hamamoto et al. | 310/90 |
| 5,412,999 | 5/1995 | Vigmostad et al. | 73/862.333 |
| 5,440,185 | 8/1995 | Allwine, Jr. | 310/156 |

Primary Examiner—Thomas M. Dougherty
Assistant Examiner—Elvin G. Enad
Attorney, Agent, or Firm—Sughrue, Mion, Zinn, Macpeak & Seas

[57] ABSTRACT

A brushless motor including: a rotor casing having a cylindrical wall with an opening, the rotor casing holding a magnet therein, the magnet having an exposed portion which is exposed through the opening of the rotor casing; a stator core having drive coils; Hall elements for detecting the magnetic field of the magnet, the Hall elements being arranged outside the cylindrical wall of the rotor casing; a drive circuit applying drive currents to the drive coils in accordance with output signals of the Hall elements; a magnetic flux varying member provided at a point on the cylindrical wall of the rotor casing; and an index signal processing circuit for generating an index signal in accordance with an output signal of one of the Hall elements.

7 Claims, 4 Drawing Sheets

BRUSHLESS MOTOR WITH HALL ELEMENTS FOR CONTROLLING DRIVE CIRCUIT AND FOR DETECTING A POSITION OF ROTOR BY USE OF MAGNETIC FLUX VARYING MEANS

BACKGROUND OF THE INVENTION

1. Field of the invention

This invention relates to a brushless motor.

2. Related art

FIG. 7 shows an example of a conventional brushless motor.

The brushless motor is of a three-phase type. In FIG. 7, reference numeral 1 designates the rotary shaft of the brushless motor. The rotary shaft 1 is rotatably supported through bearings 4 by a bearing holder 3 which is mounted on a printed circuit board 2. A cup-shaped rotor casing 5 is fixedly mounted on the upper end portion of the rotary shaft 1 as viewed in FIG. 7 so that it is turned together with the rotary shaft 1. An annular rotor magnet 6 is fixedly secured to the inner surface of the cylindrical wall of the cup-shaped rotor casing 5 in such a manner that the lower end face of the rotor magnet 6 is substantially flush with the lower end face of the cylindrical wall of the rotor casing 5 as viewed in FIG. 7, and those lower end faces are close to the upper surface of the printed circuit board 2. The annular rotor magnet 6 is magnetized so that it has N and S poles alternately in the direction of circumference. A stator core 19 having drive coils 9 is provided inside the rotor magnet 6 in such a manner that the stator core former 19 is confronted with the rotor magnet 6.

Three Hall elements 7a, 7b and 7c serving as magnetic detectors are provided so as to be confronted with the magnetized surface of the rotor magnet 6. More specifically, the Hall elements 7a, 7b and 7c are arranged on the printed circuit board 2 at intervals of an electrical angle 120°. A driving IC 8 is mounted on the printed circuit board 2. The driving IC 8 has a drive circuit (not shown) which receives the output signals of the Hall elements 7a, 7b and 7c and applies drive currents to the drive coils 9 according to the output signal, to turn the rotor.

An indexing magnet (a magnet piece) 20 is mounted on the outer surface of the cylindrical wall of the rotor casing 5. An index sensor (such as a magnetic head) 21 is provided, as a magnetic sensor, on the printed circuit board 2 in such a manner that it is confronted with the outer surface of the cylindrical wall of the rotor casing 5. The index sensor 21 detects the magnetic field of the indexing magnet 20, to provide an output signal. The output signal of the index sensor 21 is amplified by an amplifier (not shown) provided on the printed circuit board 2, to form an index signal (such as a pulse signal) whose period corresponds to one revolution of the rotor. The index signal is utilized for detection of the position of the brushless motor.

The conventional brushless motor thus organized suffers from the following difficulties:

It is essential for the motor to have the indexing magnet 20 and the index sensor 21 as position detecting means, which increases the number of components and accordingly the manufacturing cost of the motor.

On the other hand, the index signal (or position detection signal) must be coincident with a predetermined track start position. This means that the position of the index sensor must be precisely adjusted circumferentially of the motor. The adjustment is considerably difficult.

SUMMARY OF THE INVENTION

In view of the foregoing, an object of the invention is to provide a brushless motor which can be readily manufactured at low cost.

According to an aspect of the present invention, there is provided a brushless motor comprising:

a rotor casing having a cylindrical wall with an opening, said rotor casing holding a magnet therein, said magnet having an exposed portion which is exposed through the opening of said rotor casing;

a stator core having drive coils confronted with said magnet;

Hall elements for detecting the magnetic field of said magnet, said Hall elements being arranged outside the cylindrical wall of said rotor casing;

a drive circuit for applying drive currents to said drive coils in accordance with output signals of said Hall elements;

a magnetic flux varying member provided at a point on the cylindrical wall of said rotor casing; and an index signal processing circuit for generating an index signal in accordance with an output signal of one of said Hall elements.

In the brushless motor, the magnetic flux varying member may include a cut out portion formed in the cylindrical wall of the rotor casing.

Alternatively the magnetic flux varying member may include a protrusion extended from the cylindrical wall of the rotor casing in such a manner as to cover a portion of the exposed portion of the magnet.

In the brushless motor of the invention, the Hall element operating as a driving magnetic detector is employed also as an index signal detecting magnetic detector. This makes it possible to form the brushless motor without the indexing magnet and the index sensor which are essential in the conventional brushless motor, which contributes to reduction of the manufacturing cost of the brushless motor. The magnetic flux varying means for obtaining the index signal, namely, the cut out portion formed in the cylindrical wall of the rotor casing can or the protrusion extended from the cylindrical wall, can be readily obtained. Further an accurate index signal can be obtained by a simple-method of aligning the magnetic flux varying means with the magnetized part of the magnet.

DETAILED DESCRIPTION OF THE PREFERRED EMBODIMENTS

Preferred embodiments of the invention will be described with reference to the accompanying drawings.

Figure 1:
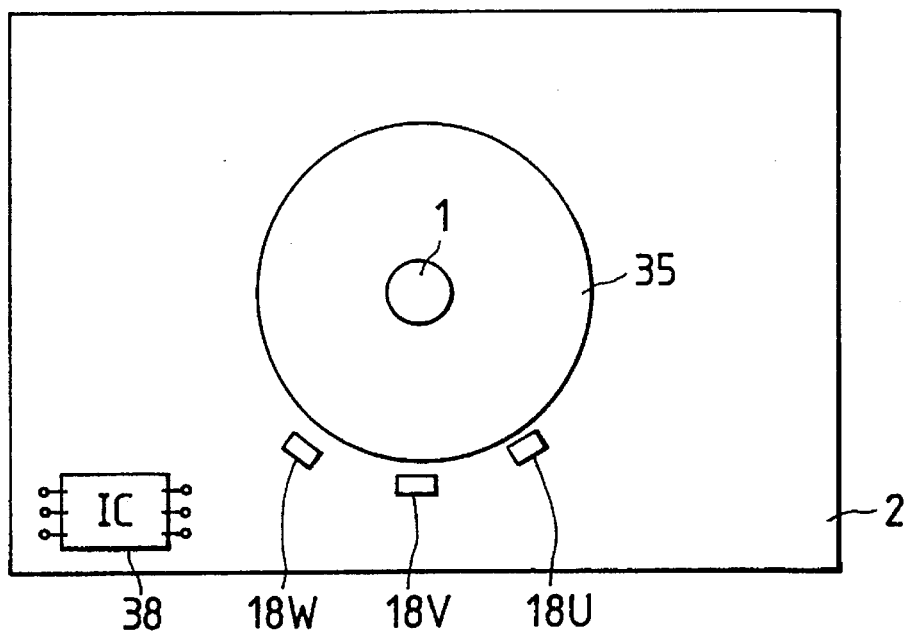
FIG. 1 is a plan view showing an example of a brushless motor, which constitutes a first embodiment of the invention.
Figure 2:
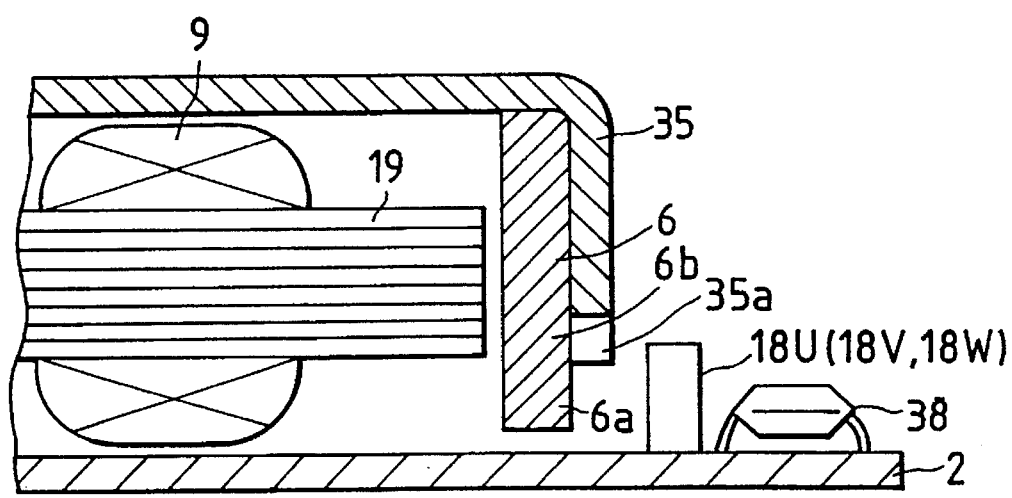
FIG. 2 is a fragmentary sectional view showing essential components of the brushless motor shown in FIG. 1.
Figure 3:
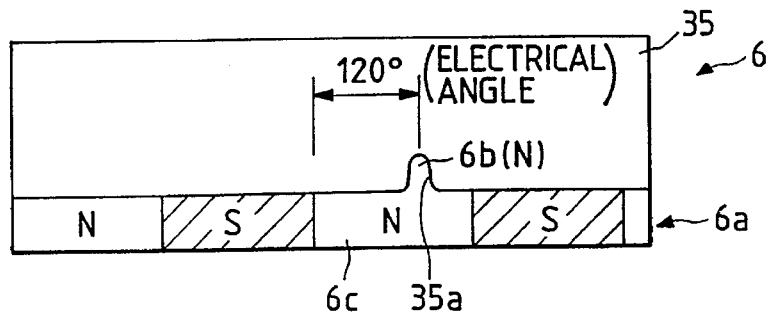
FIG. 3 is a front view showing a rotor casing and a magnet in the brushless motor shown in FIGS. 1 and 2.
Figure 7:
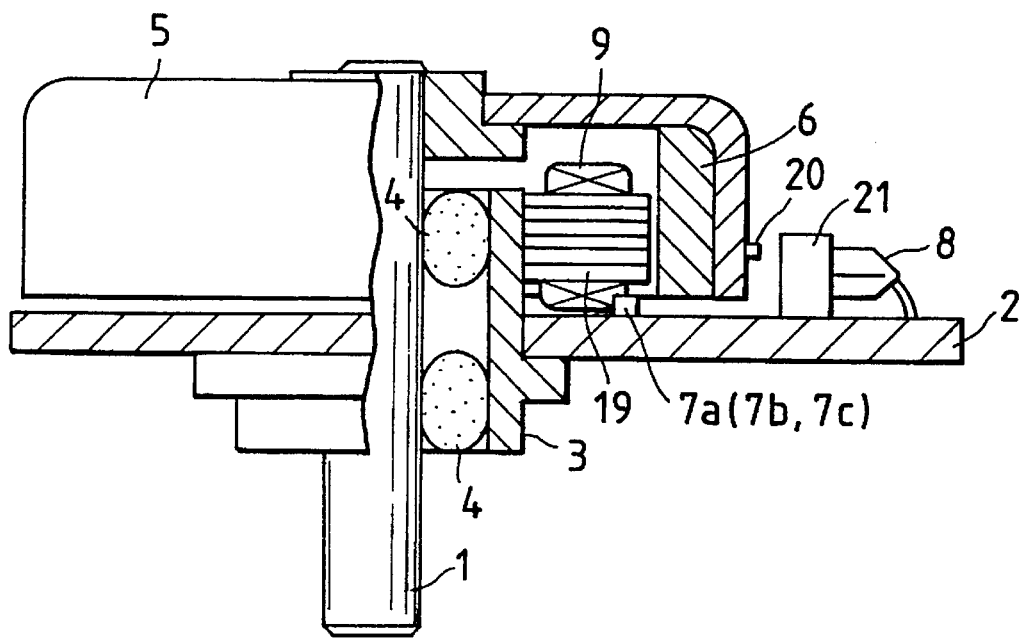
FIG. 7 is a front view, with parts cut away, showing a conventional brushless motor.

FIG. 1 is a plan view showing a brushless motor, which constitutes a first embodiment of the invention. FIG. 2 is a fragmentary sectional view showing essential components of the brushless motor shown in FIG. 1. FIG. 3 is a front view of a rotor casing and a magnet in the brushless motor. In FIGS. 1, 2 and 3, parts corresponding functionally to those which have been described with respect to the conventional brushless motor (FIG. 7) are designated by the same reference numerals or characters.

The brushless motor shown in FIGS. 1 through 3 is a three-phase brushless motor. Its magnet 6 is mounted on the inner surface of the cylindrical wall of a rotor casing 35 in such a manner that, as shown in FIG. 2, it is protruded axially through the opening of the rotor casing 35, that is its lower end portion is exposed below the rotor casing 35. As shown in FIG. 3, the cylindrical wall of the rotor casing 35 has magnetic flux varying (increasing and decreasing) means, namely, a cut out of portion 35a formed in the lower edge of the cylindrical wall of the rotor casing 35. The position of the cut out portion 35a corresponds, for instance, to an electrical angle θ of 120° of a given N pole 6c of the magnet 6; in other words, it is shifted about an electrical angle of 30° from the magnetic center of the N pole 6c.

As shown in FIGS. 1 and 3, three Hall elements 18U, 18V and 18W are arranged on a printed circuit board 2 in such a manner that they are located outside the magnet 6. These Hall elements are for detecting the magnetic fields of the magnetic poles of the portion 6a of the magnet 6 which is exposed below the rotor casing 35 (hereinafter referred to as "a lower end portion 6a", when applicable), and the magnetic field of the portion 6b which is exposed through the cut 35a.

Figure 4:
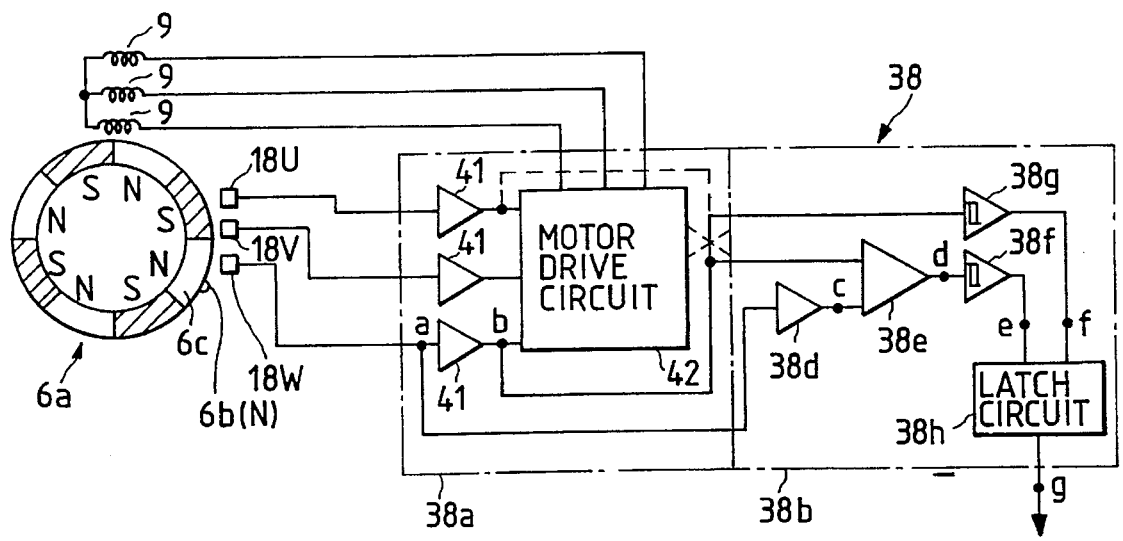
FIG. 4 is an explanatory diagram, partly as a block diagram, showing the arrangement of the motor, and an IC provided for the latter.
Figure 5A:
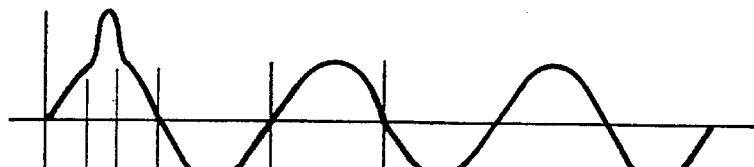
FIGS. 5 (a) to (g) are time charts for a description of the operation of the IC.
Figure 5B:
Figure 5C:
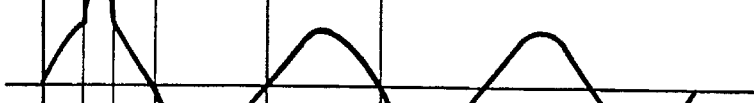
Figure 5D:
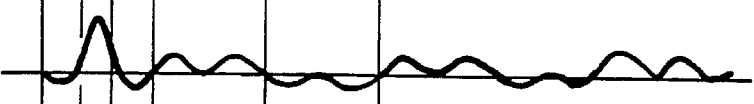
Figure 5E:
Figure 5F:
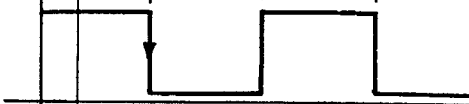
Figure 5G:
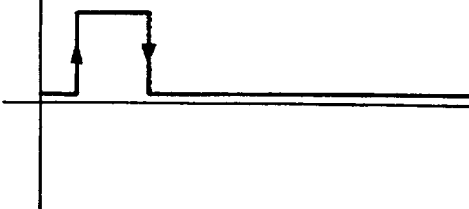

An IC 38 is mounted on the printed circuit board 2. The IC 38, as shown in FIG. 4, is connected to the output terminals of the Hall elements 18U, 18V and 18W, and includes a drive circuit 38a and an index signal processing circuit 38b. The drive circuit 38a receives the output signals of the Hall elements 18U, 18V and 18W to apply drive currents to drive coils 9, 9 and 9. The index signal processing circuit 38b operates to form an index signal by using the output signal of one of the Hall elements 18U, 18V and 18W—in the embodiment, the output signal of the Hall element 18W is used.

The output signals of the Hall elements 18U, 18V and 18W are applied to the drive circuit 38a, while the output signal of the Hall element 18W is further applied to the index signal processing circuit 38b. In the drive circuit 38a, the output signals of the Hall elements 18U, 18V and 18W are subjected to logarithmic compression by Hall signal differential amplifiers 41, 41 and 41, and applied to a motor drive circuit 42.

The index signal processing circuit 38 comprises: a linear amplifier 38d; a differential amplifier 38e; first and second waveform shaping circuits 38f and 38g; and a latch circuit 38h. The linear amplifier 38d is connected to the Hall element 18W, to amplify the output signal of the latter 18W. The differential amplifier 38e has two input terminals. One of the input terminal is connected to the output terminal of the linear amplifier 38d, and the other input terminal is connected to the output terminal of the Hall signal differential amplifier 41 connected to the Hall element 18W thus selected, so that the output signal of the linear amplifier 38d is compared with the output signal of the Hall signal differential amplifier 41. The first waveform shaping amplifier 38f is connected to the output terminal of the differential amplifier 38e, to shape the waveform of the output signal of the latter 38e. The second waveform shaping amplifier 38g is connected to the output terminal of the Hall signal differential amplifier 41 connected to the selected Hall element 18W, to shape the waveform of the output signal of the Hall signal differential amplifier 41. The latch circuit 38h receives the output signals of the first and second waveform shaping amplifiers 38f and 38g. More specifically, the latch circuit 38h utilizes the output signal of the first waveform shaping amplifier 38g to set its output level to a predetermined value, and utilizes the output signal of the second waveform shaping amplifier 38f to reset the output level, to output an index signal (or a position detection signal).

For clarification and simplification, in FIG. 4 the drive coils 9, 9 and 9 are drawn outside the magnet 6a, and the portion 6b of the magnet 6 which is exposed through the cut 35a is drawn as protruded outwardly from the given N pole 6c of the magnet 6. However, in reality, as shown in FIGS. 2 and 3, the coils 9 are positioned confronted with the inner surface of the magnet 6, and the portion 6b exposed through the cut out portion 35a is integral with and flush with the exposed lower end portion 6a.

The brushless motor thus constructed operates as follows:

The rotor is turned by application of predetermined voltages to the drive coils 9. During the rotation of the rotor, the N and S poles formed in the lower end portion 6a of the magnet 6, which is exposed below the rotor casing, are alternately confronted with the three Hall elements 18U, 18V and 18W. As a result, the Hall elements 18U, 18V and 18W output sinusoidal signals depending on the variations in direction of the magnetic fields of those N and S pole. Those sinusoidal signals, as shown in the part (a) of FIG. 5, have a pulse-like peak per revolution of the rotor, because the portion (N pole) 6b of the magnet 6 is exposed through the cut out portion 35a. The output signals are amplified and subjected to logarithmic compression by the Hall signal differential amplifiers 41, so that they are each converted into a signal shown in the part (b) of FIG. 5 which has no pulse-like peak. The signals thus obtained are applied to the motor drive circuit 42. In response to the signals, drive currents are applied to the drive coils 9, 9 and 9 to turn the rotor.

On the other hand, the sinusoidal signal having the pulse-like peak per revolution of the rotor as shown in the part (a) of FIG. 5 is amplified, as it is, by the linear amplifier 38d as shown in the part (c) of FIG. 5, and applied to the differential amplifier 38e, where it is compared with the output signal having no pulse-like peak as shown in the part (b) of FIG. 5. As a result, the differential amplifier 38e outputs a signal in which the pulse-like peak remains as shown in the part (d) of FIG. 5. The output signal of the differential amplifier 38e is applied to the first waveform shaping amplifier 38f, where it is shaped into a pulse signal as shown in the part (e) of FIG. 5.

The pulse signal is applied to the latch circuit 38h, so that the output of the latch circuit 38h is set to "H (high)" level. On the other hand, the output signal as shown in the part (b) of FIG. 5 is applied to the second waveform shaping amplifier 38g, where it is shaped into a pulse signal as shown in the part (f) of FIG. 5. The pulse signal is applied to the latch circuit 38h, so that the output of the latter 38h is reset to "L (low)" level. As a result, the latch circuit 38h outputs a pulse signal as shown in the part (g) of FIG. 5. This is the index signal.

The waveforms shown in the parts (a) through (g) of FIG. 5 correspond to circuit points a through g in FIG. 4, respectively.

As was described above, in the embodiment, the lower end portion 6a of the magnet 6, being protruded axially through the opening of the rotor casing 35, is exposed below the casing 35, and the cut out portion 35a is formed, as the magnetic flux varying (increasing and decreasing) means, in the cylindrical wall of the rotor casing 35. The Hall elements 18U, 18V and 18W are arranged outside the cylindrical wall of the rotor casing 35, and the index signal processing circuit 38b receives one of the output signals of the Hall elements 18U, 18V and 18W to form the index signal. Hence, in the embodiment, the Hall element 18W (which may be replaced by the Hall element 18V or 18U) operating as a driving magnetic detector is employed also as an index signal detecting magnetic detector. Owing to this feature, the brushless motor of the invention can be manufactured without the indexing magnet 20 and the index sensor 21 which are essential in the conventional brushless motor, which contributes to reduction of the manufacturing cost of the brushless motor.

The cut out portion 35a required for formation of the index signal can be readily formed, and an accurate index signal can be obtained by a simple method of aligning the cut out portion 35a with the magnetized part of the magnet 6. Hence, the brushless motor of the invention is free from the troublesome process accompanying the conventional brushless motor wherein the position of the index sensor must be adjusted in the direction of rotation so that the index signal is coincident with the predetermined track start position. Thus, the brushless motor of the invention can be manufactured readily when compared with the conventional one.

Figure 6:
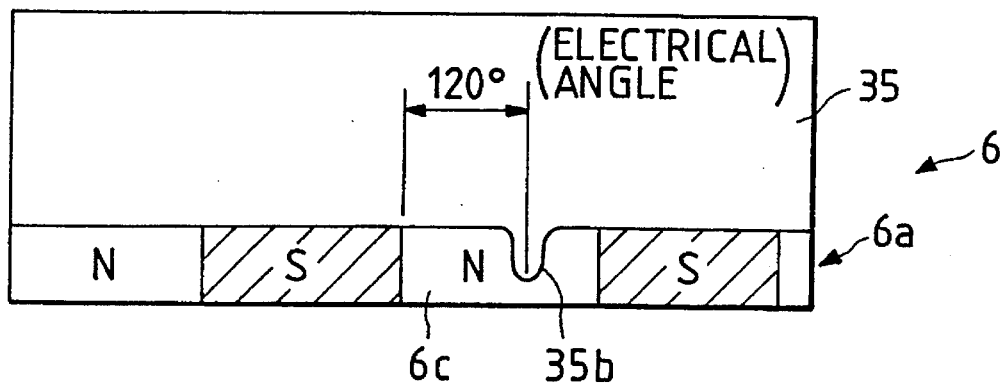
FIG. 6 is a front view showing a rotor casing and a magnet in another example of the brushless motor, which constitutes a second embodiment of the invention.

FIG. 6 is a front view showing a rotor casing and a magnet in another example of the brushless motor, which constitutes a second embodiment of the invention.

The second embodiment is different from the above-described first embodiment in that, instead of the cut out portion 35a, the rotor casing 35 has a tongue-shaped protrusion 35b as the magnetic flux varying means which is extended downwardly from the lower edge of the cylindrical wall of the rotor casing 35 in such a manner that it covers a part of the lower end portion 6a of the magnet 6 which is exposed below the rotor casing 35.

As is apparent from the above description, the tongue-shaped protrusion 35b is a part of the cylindrical wall of the rotor casing 35. Similarly as in the case of the above-described cut out portion 35a, the position of the protrusion 35b corresponds, for instance, to an electrical angle $\theta_e$ of 120° of a given N pole 6c of the magnet 6; in other words, it is shifted about an electrical angle of 30° from the magnetic center of the N pole 6c.

The lower end portion 6a of the magnet 6 which is exposed below the rotor casing 35 is partially covered by the protrusion 35b at the given magnetic pole, so that the magnetic flux is decreased at the position of the protruded piece 35b. Hence, the sinusoidal signals outputted by the Hall elements 18U, 18V and 18W are not normal; that is, their waveforms have a sharp decay at the same position out portion the output signals of the Hall elements have the pulse-like peak in the first embodiment. The output signals that are abnormal in waveform are processed in the same manner as those in the first embodiment, in order to obtain the index signal. Hence, the second embodiment has the same effects or merits as the first embodiment.

While the invention has been described in connection with its preferred embodiments, the invention is not limited thereto or thereby, and it will be obvious to those skilled in the art that various changes and modifications may be made therein without departing from the invention. For instance, in the above-described embodiments, the magnetic flux varying means 35a and 35b are provided at the N pole 6c of the magnet 6 mounted on the rotor casing 35; however, they may be provided at any one of the S poles of the magnet 6.

Furthermore, in the above-described embodiments, the output signal of the Hall element 18W is utilized to form the index signal; however, it goes without saying that the output signal of the Hall element 18U or 18V may be used.

In addition, the output signal of the Hall signal differential amplifier 41 connected as indicated by the dotted line in FIG. 4 may be utilized so that the latch circuit 38h is operated with the timing of the fall of the output signal shown in the part (e) of FIG. 5 and with the timing of the rise of the output signal shown in the part (f) of FIG. 5. Moreover, the output signal of the other Hall element may be equally utilized.

In the above-described embodiments, the magnetic flux varying means 35a and 35b are shifted an electrical angle of about 30° from the magnetic center of a given N pole 6c of the magnet 6; however, the invention is not limited thereto or thereby.

While the invention has been described with reference to the three-phase brushless motor, the technical concept of the invention may be equally applied to other brushless motors.

As was described above, in the brushless motor of the invention, a portion of the magnet is exposed through the opening of the rotor casing, the magnetic flux varying means is provided by using the cylindrical wall of the rotor casing; that is, the cut is formed in the cylindrical wall of the rotor casing or a protrusion is extended from the cylindrical wall of the rotor casing in such a manner as to cover a part of the exposed portion of the magnet. The Hall elements are arranged outside the cylindrical wall of the rotor casing, and the index signal processing circuit is provided to receive the output signal of one of the Hall elements to form the index signal. The Hall element operating as the driving magnetic detector is employed also as the index signal detecting magnetic detector. This feature makes it possible to form the brushless motor without the indexing magnet and the index sensor which are essential in the conventional brushless motor, which contributes to reduction of the manufacturing cost of the brushless motor.

The magnetic flux varying means for obtaining the index signal, namely, the cut out portion formed in the cylindrical wall of the rotor casing or the protrusion extended from the cylindrical wall can be readily obtained, and an accurate index signal can be obtained by the simple method of aligning the magnetic flux varying means with the magnetized part of the magnet. Hence, the brushless motor of the invention can be manufactured readily when compared with the conventional brushless motor.

What is claimed is:

1. A brushless motor comprising:

a rotor casing having a cylindrical wall which defines an opening in said rotor casing, said rotor casing having a magnet secured to an inner surface of said cylindrical wall, said magnet having an exposed portion which is protruded beyond the inner surface of said cylindrical wall so as to be exposed to an outside of said rotor casing;

a stator core having drive coils and confronting said magnet;

Hall elements for detecting a magnetic field of said magnet, said Hall elements being arranged outside the cylindrical wall of said rotor casing so as to confront the exposed portion of said magnet;

a drive circuit for applying drive currents to said drive coils in accordance with output signals of said Hall elements;

magnetic flux varying means provided at a point on the cylindrical wall of said rotor casing for varying a magnetic flux produced by said magnet; and an index signal processing circuit for generating an index signal indicative of a position of said rotor casing in accordance with an output signal of one of said Hall elements.

2. A brushless motor as claimed in claim 1, wherein said magnetic flux varying means comprises a cut out portion formed in the cylindrical wall of said rotor casing.

3. A brushless motor as claimed in claim 1, wherein said magnetic flux varying means comprises a protrusion extended from the cylindrical wall of said rotor casing so as to cover a part of said exposed portion of said magnet.

4. A brushless motor as claimed in claim 1, wherein said brushless motor is a three-phase motor, and wherein said magnetic flux varying means is shifted by an electrical angle of about 30° from a magnetic center of one pole of said magnet.

5. A brushless motor as claimed in claim 1, wherein said brushless motor is an m-phase motor, and wherein said magnetic flux varying means is shifted by an electrical angle of about ± 90/m° from a magnetic center of one pole of said magnet.

6. A brushless motor as claimed in claim 1, wherein, in order to obtain an accurate index signal, said magnetic flux varying means is shifted by a predetermined electrical angle from a magnetic center of one pole of said magnet, said predetermined electrical angle corresponding to a number of phases of said brushless motor.

7. A brushless motor as claimed in claim 1, wherein said magnetic flux varying means is aligned with a predetermined magnetized part of said magnet.

* * * * *